United States Patent
Lee et al.

(10) Patent No.: US 10,257,324 B2
(45) Date of Patent: Apr. 9, 2019

(54) LINK ADAPTATION FOR MULTI-USER TRANSMISSION IN 802.11 SYSTEMS

(71) Applicant: NEWRACOM, Inc., Irvine, CA (US)

(72) Inventors: Daewon Lee, Irvine, CA (US); Yongho Seok, Irvine, CA (US); Yujin Noh, Irvine, CA (US); Sungho Moon, San Jose, CA (US); Minho Cheong, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 305 days.

(21) Appl. No.: 15/008,622

(22) Filed: Jan. 28, 2016

(65) Prior Publication Data

US 2016/0227599 A1 Aug. 4, 2016

Related U.S. Application Data

(60) Provisional application No. 62/109,962, filed on Jan. 30, 2015, provisional application No. 62/113,952, filed on Feb. 9, 2015.

(51) Int. Cl.
*H04L 1/00* (2006.01)
*H04L 29/06* (2006.01)
(Continued)

(52) U.S. Cl.
CPC .......... *H04L 69/22* (2013.01); *H04L 1/0001* (2013.01); *H04L 1/0028* (2013.01); *H04L 1/1671* (2013.01); *H04W 84/12* (2013.01)

(58) Field of Classification Search
None
See application file for complete search history.

(56) References Cited

U.S. PATENT DOCUMENTS

2012/0051246 A1 3/2012 Zhang et al.
2012/0177144 A1 7/2012 Lee et al.
(Continued)

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
(Continued)

*Primary Examiner* — Phirin Sam
*Assistant Examiner* — Sori A Aga
(74) *Attorney, Agent, or Firm* — Nicholson De Vos Webster & Elliott LLP

(57) ABSTRACT

The embodiments provide a method implemented by a network device for transmitting link adaptation feedback in a Wireless Local Area Network (WLAN) that supports multi-user simultaneous transmission. The method generates and transmits a frame that includes one or more link adaptation feedback values associated with a wireless communications link between the network device and a second network device. In one aspect, the one or more link adaptation feedback values may include a link adaptation feedback value for an entire operation bandwidth of the wireless communications link and a link adaptation feedback value for a given subchannel within the operation bandwidth. In another aspect, link adaptation feedback values for one or more users of a multi-user simultaneous transmission are transmitted in a multi-user acknowledgment (ACK) frame. The embodiments allow for efficient link adaptation in a multi-user simultaneous transmission environment.

15 Claims, 12 Drawing Sheets

(51) Int. Cl.
*H04W 84/12* (2009.01)
*H04L 1/16* (2006.01)

(56) References Cited

U.S. PATENT DOCUMENTS

| | | | |
|---|---|---|---|
| 2014/0126658 A1* | 5/2014 | Li | H04L 1/0003 |
| | | | 375/259 |
| 2017/0063512 A1* | 3/2017 | Wu | H04L 5/0023 |
| 2017/0310424 A1* | 10/2017 | Chun | H04L 1/16 |

OTHER PUBLICATIONS

IEEE Std 802.11ac-2013: "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.

IEEE Std 802.11n-2009: "Part 11: Wireless LAN Medium Access Control (MAC) and Physical Layer Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

\* cited by examiner

| B1 | B2 | B3 ~ B5 | B6 ~ B8 | B9 ~ B23 | B24 ~ B26 | B27 | B28 | B29 |
|---|---|---|---|---|---|---|---|---|
| S1G/HE | MRQ | MSI/STBC | MFSI/GID-L | MFB | GID-H | Coding Type | FB Tx Type | Unsolicited MFB |
| 1 | 1 | 1 | 3 | 15 | 3 | 1 | 1 | 1 |

VHT Format

| B9 ~ B11 | B12 ~ B15 | B16 ~ B17 | B18 ~ B23 |
|---|---|---|---|
| NUM_STS | VHT-MCS | VHT-BW | SNR |
| 3 | 4 | 2 | 6 |

S1G Format

| B9 ~ B10 | B11 ~ B14 | B15 ~ B17 | B18 ~ B23 |
|---|---|---|---|
| NUM_STS | S1G-MCS | S1G-BW | SNR |
| 2 | 4 | 3 | 6 |

HE Format

| B9 ~ B11 | B12 ~ B15 | B16 ~ B17 | B18 ~ B19/20 | B20/21 ~ B23 |
|---|---|---|---|---|
| NUM_STS | HE-MCS1 | HE-BW | HE-MCS2 (delta) | Subchannel |
| 3 | 4 | 2 | 2 or 3 | 4 or 3 |

FIG. 3

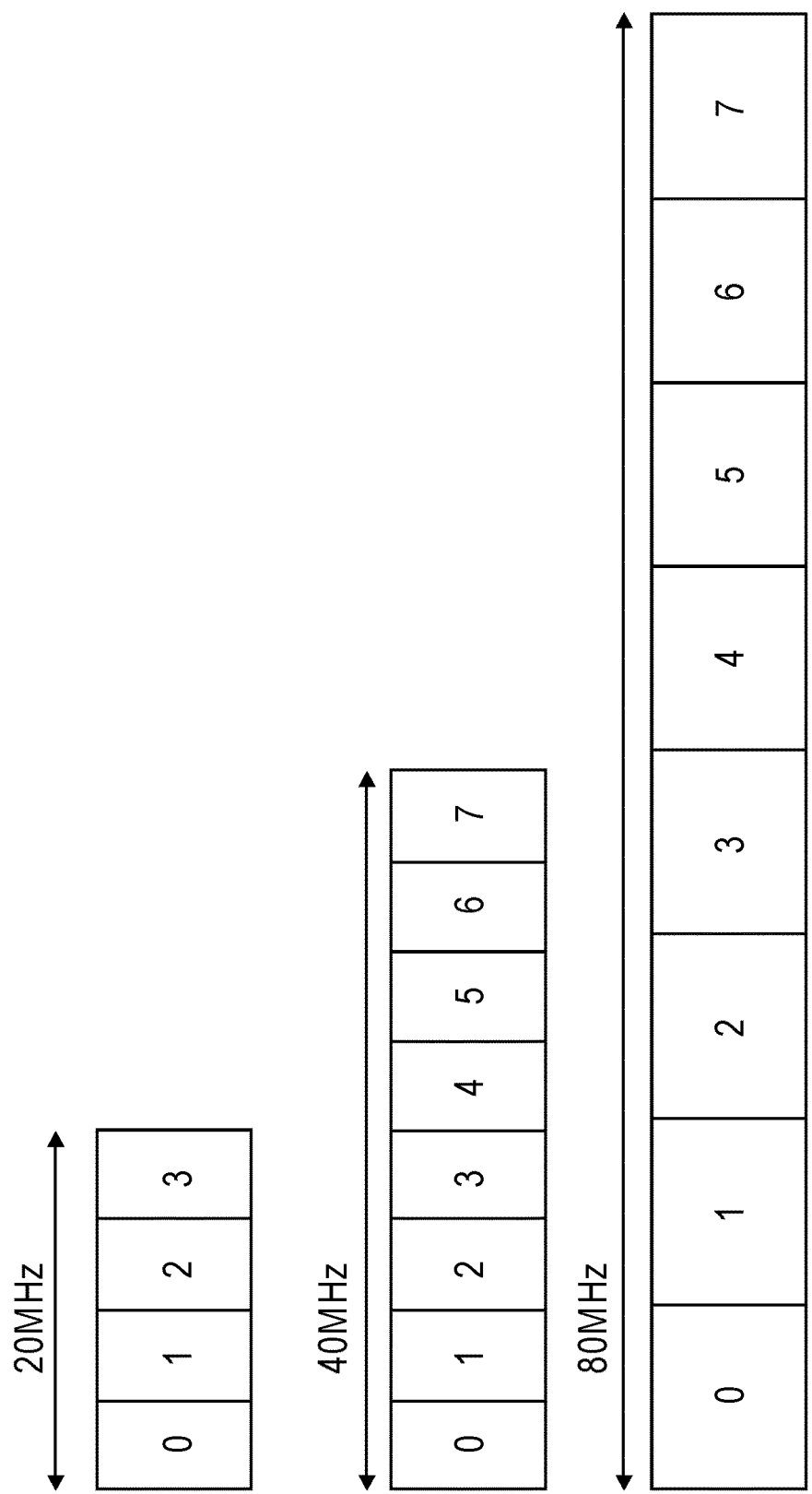

LINK ADAPTATION FOR MULTI-USER TRANSMISSION IN 802.11 SYSTEMS

CROSS-REFERENCE TO RELATED APPLICATIONS

This application claims the benefit of U.S. Provisional Application No. 62/109,962, filed Jan. 30, 2015, and U.S. Provisional Application No. 62/113,952, filed Feb. 9, 2015, which are hereby incorporated by reference.

FIELD OF INVENTION

The embodiments of the invention are related to the field of Wireless Local Area Network (WLAN) operation. More specifically, the embodiments of the invention relate to a method and apparatus for transmitting link adaptation information in a WLAN that supports multi-user simultaneous transmission. Other embodiments are also disclosed.

BACKGROUND

Institute of Electrical and Electronics Engineers (IEEE) 802.11 is a set of physical and media access control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environment are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

The IEEE 80211ax task group is discussing a High Efficiency WLAN (HEW) system that operates in the 2.4 GHz and 5 GHz bands and supports a channel bandwidth (or channel width) of 20 MHz, 40 MHz, 80 MHz, or 160 MHz. The HEW aims at improving performance felt by users demanding high-capacity and high-rate services. The HEW may support Orthogonal Frequency-Division Multiple Access (OFDMA) and thus may include the capability to handle multiple simultaneous transmissions (e.g., multi-user simultaneous transmission) in both the spatial and frequency domains, in both the uplink (UL) and downlink (DL) directions.

Link adaptation is a technique for adapting parameters of a wireless communications link between a transmitting STA and a receiving STA based on measurements of the link quality in order to maximize transmission rate. The receiving STA may provide feedback regarding the quality of the link to the transmitting STA. The transmitting STA may use this information to select an appropriate Modulation and Coding Scheme (MCS) to use when transmitting frames to the receiving STA.

Link adaptation feedback values for existing IEEE 802.11 systems are transmitted as part of the Media Access Control (MAC) header. However, link adaptation feedback in existing IEEE 802.11 systems only provide feedback for a given operation bandwidth (either 20 MHz, 40 MHz, 80 MHz, or 160 MHz). Also, existing IEEE 802.11 systems do not provide a way to transmit link adaptation feedback for users of a multi-user simultaneous transmission in a multi-user acknowledgment (ACK) frame.

SUMMARY

The embodiments provide a method implemented by a network device for transmitting link adaptation feedback in a Wireless Local Area Network (WLAN) that supports multi-user simultaneous transmission. The method generates and transmits a frame that includes one or more link adaptation feedback values associated with a wireless communications link between the network device and a second network device. In one aspect, the one or more link adaptation feedback values may include a link adaptation feedback value for an entire operation bandwidth of the wireless communications link and a link adaptation feedback value for a given subchannel within the operation bandwidth. In another aspect, link adaptation feedback values for one or more users of a multi-user simultaneous transmission are transmitted in a multi-user acknowledgment (ACK) frame. The embodiments allow for more efficient link adaptation in a multi-user simultaneous transmission environment.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 3 is a diagram illustrating an exemplary HT Control Middle field format, according to some embodiments.

FIG. 4 is a diagram illustrating subchannel division for various operation bandwidth sizes, according to some embodiments.

DETAILED DESCRIPTION

Figure 1:
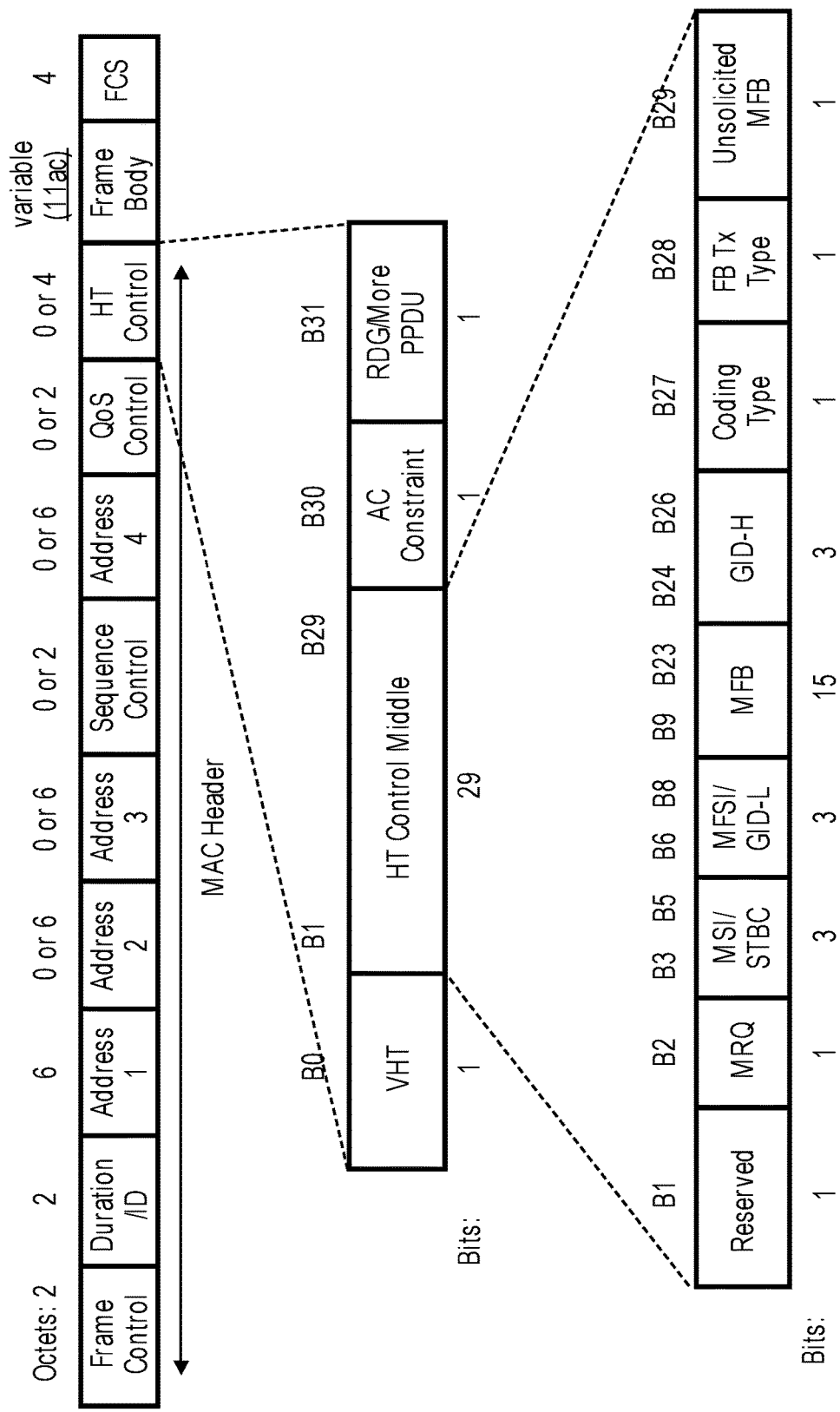
FIG. 1 is a diagram illustrating an exemplary MAC frame format, according to some embodiments.

The embodiments disclosed herein provide a method and apparatus for providing link adaptation feedback in a wireless communication system such as a wireless local area network (WLAN) implementing Institute of Electrical and Electronics Engineers (IEEE) 802.11 that supports multi-user simultaneous transmission. In one aspect, embodiments disclosed herein provide a mechanism to transmit link adaptation feedback for a subchannel within an operation bandwidth of a wireless communications link. In another aspect, embodiments disclosed herein provide a mechanism to transmit link adaptation feedback in a multi-user acknowledgement (ACK) frame. Other embodiments are also described and claimed.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include stations (STAs) and access points (APs) in wireless communications systems such as wireless local area network (WLAN). Stations (STAs) are devices connected to and communicating in a WLAN including client or user devices that connect to the WLAN via access points (APs). APs are network devices that may be specialized wireless access points that can communicate with other network devices in the WLAN via the wireless medium or via wired connections. A STA or AP may be referred to herein as a WLAN device.

Existing IEEE 802.11 systems provide link adaptation feedback for a given operation bandwidth (either 20 MHz, 40 MHz, 80 MHz, or 160 MHz), but do not provide feedback for subchannels in Orthogonal Frequency-Division Multiple Access (OFDMA). In OFDMA, an operation bandwidth can be divided on frequency axis into multiple subchannels. It is possible that subcarriers of each subchannel do not overlap with subcarriers of any other subchannels. Each subchannel can be assigned to a different user (e.g., a WLAN device) to support multi-user simultaneous transmission. A subchannel, as used herein, refers to a frequency resource (within an operation bandwidth) that is allocated to a user of a multi-user simultaneous transmission. The term subchannel may also be referred to as a Resource Unit (RU), a frequency resource assignment unit, or subband. Embodiments described herein overcome the disadvantages of existing link adaptation feedback techniques by providing link adaptation feedback for subchannels within an operation bandwidth.

In IEEE 802.11 systems, link adaptation feedback can be solicited or unsolicited. In solicited feedback, a transmitter WLAN device requests link adaptation feedback from a receiver WLAN device. In response to the request, the receiver WLAN device transmits link adaptation feedback values (e.g., Modulation Coding Scheme (MCS) or Signal-to-Noise Ratio (SNR)) to the transmitter WLAN device. The receiver WLAN device may compute the link adaptation feedback values based on the frame that contained the request. In unsolicited feedback, the receiver WLAN device autonomously (without receiving a request from the transmitter WLAN device) transmits link adaptation feedback values to the transmitter WLAN device. That is, the receiver WLAN device transmits link adaptation feedback values to the transmitter WLAN device even though the transmitter WLAN device has not requested such information. The receiver WLAN device may compute the link adaptation feedback values based on a frame chosen by the receiver WLAN device. The receiver WLAN device may also convey some basic information about the chosen frame to the transmitter WLAN device.

Link adaptation feedback values in IEEE 802.11 systems are typically sent as part of the MAC header, and more specifically, in an HT Control field of the MAC header. An exemplary MAC frame format and details of the HT Control field are shown in FIG. 1 and described in additional detail below.

FIG. 1 is a diagram illustrating an exemplary MAC frame format, according to some embodiments. The MAC frame format includes an HT Control field. The HT Control field is always present in Control Wrapper frames and is present in QoS Data and Management frames, as determined by the Order bit of the Frame Control field. The HT Control field includes a Very High Throughput (VHT) field, a High Throughput (HT) Control Middle field, an Access Category (AC) Constraint field, and a Reverse Direction Grant (RDG)/More Physical Layer Convergence Protocol (PLCP) Protocol Data Unit (PPDU) field. As shown, the VHT field is 1 bit in length. The VHT field indicates the format of the HT Control Middle field. A value of 0 in this field indicates that the HT Control Middle field is an HT variant HT Control Middle field. A value of 1 in this field indicates that the HT Control Middle field is a VHT variant HT Control Middle field. The AC Constraint field is 1 bit in length. A value of 0 in this field indicates that the response to an RDG may contain data frames from any Traffic Identifier (TID). A value of 1 in this field indicates that the response to an RDG may contain data frames only from the same AC as the last data frame received from the RD initiator. The RDG/More PPDU field is 1 bit in length. For an RD initiator, a value of 0 in this field indicates no reverse grant, while a value of 1 in this field indicates that an RDG is present, as defined by the Duration/ID field. For an RD responder, a value of 0 in this field indicates that the PPDU carrying the frame is the last transmission by the RD responder, while a value of 1 indicates that the PPDU carrying the frame is to be followed by another PPDU.

The HT Control Middle field is 29 bits in length. A VHT variant HT Control Middle field is shown in the diagram. Link adaptation feedback values such as an indication of an MCS and SNR are typically provided in the MCS Feedback (MFB) field of the HT Control Middle field. However, as discussed above, link adaptation feedback values for existing IEEE 802.11 systems only provide feedback for a given operation bandwidth (either 20 MHz, 40 MHz, 80 MHz, or 160 MHz), and do not provide link adaptation feedback for subchannels in OFDMA. Embodiments disclosed herein provide mechanisms for providing link adaptation feedback for one or more subchannels in OFDMA.

Link adaptation in a WLAN that employs OFDMA may require a different frame format (compared to existing frame formats) to support additional features related to OFDMA. As such, WLAN devices may need to be able to distinguish between HT variant (e.g., for 802.11n), VHT variant (e.g., for 802.11ac), and S1G variant (e.g., for 802.11ah) HT Control field formats, as well as HE variant (e.g., for 802.11ax) HT Control field format that provides support for OFDMA. In one embodiment, the B1 bit of the HT Control field may be used to distinguish between field formats. For example, the B1 bit of the HT Control field (which is reserved in the VHT variant HT Control field) may be used to distinguish between VHT variant and Sub 1 GHz (S1G)/HE variant field formats. Currently, S1G transmission and reception is defined in the 900 MHz spectrum and HE (802.11ax) transmission and reception is being defined in the 2.4 GHz and 5 GHz spectrums. Thus, in one embodiment, a WLAN device may distinguish between the S1G variant field format and the HE variant field format based on the operation band of the transmitted/received signal. For example, if the WLAN device is operating in 2.4 GHz and/or 5 GHz bands, then the value of the B1 bit indicates whether the HT Control field has an HE variant field format. If the WLAN device is operating in 900 MHz band, then the value of the B1 bit indicates whether the HT Control field has an S1G variant field format.

In one embodiment, field format for the HT Control field can be distinguished as summarized in the Table I. As shown in Table I, setting the B0 bit to 0 indicates that the HT Control field has an HT variant field format, regardless of the B1 bit and the operating band. Setting the B0 bit to 1 and the B1 bit to 0 indicates that the HT Control field has a VHT variant field format, regardless of the operating band. When the operating band is 900 MHz band, setting the B0 bit to 1 and the B1 bit to 1 indicates that the Control field has an S1G variant field format. In one embodiment, when the operating band is 900 MHz band, the Control field has an S1G variant field format, regardless of the B0 bit and the B1 bit. When the operating band is 2.4 GHz band and/or 5 GHz band, setting the B0 bit to 1 and the B1 bit to 1 indicates that the Control field has an HE variant field format.

TABLE I

| B0 bit | B1 bit | Operating band | Control field |
|---|---|---|---|
| 0 | X | X | HT variant HT Control field |
| 1 | 0 | X | VHT variant HT Control field |
| 1 or X | 1 or X | 900 MHz | S1G variant HT Control field |
| 1 | 1 | 2.4 GHz and/or 5 GHz | HE variant HT Control field |

According to some embodiments, in order to support efficient link adaptation in a WLAN that employs OFDMA, a frame includes a link adaptation feedback value for an entire operation bandwidth (e.g., indicated in the HT Control field, which is typically the same bandwidth as the packet that was measured for link adaptation feedback), and also includes a link adaptation feedback value for one or more subchannels within the operation bandwidth (e.g., one or more frequency resource assignment units in OFDMA). As used herein, a link adaptation feedback value for an operation bandwidth or a subchannel is a value that is indicative of a link/channel quality of that operation bandwidth or subchannel. Examples of link adaptation feedback values include, but are not limited to, Modulation Coding Scheme (MCS) and Signal-to-Noise Ratio (SNR). It should be noted that a subchannel may be a contiguous frequency resource or a non-contiguous frequency resource.

In one embodiment, the frame includes a link adaptation feedback value for the subchannel that has the best channel response (e.g., channel gain) among the subchannels within the operation bandwidth. The subchannel that has the best channel response can be determined based on measuring channel response of one or more frames.

In one embodiment, for solicited feedback in response to an OFDMA transmission, the frame may include a link adaptation feedback value for the subchannel allocated to the WLAN device in the OFDMA transmission. For example, the frame may include a link adaptation feedback value for the subchannel in the OFDMA transmission that included the link adaptation feedback request frame (e.g., an MCS request frame).

In one embodiment, for solicited feedback in response to a non-OFDMA transmission, the frame may include a link adaptation feedback value for the entire bandwidth in which the link adaptation feedback request frame was transmitted or a link adaptation feedback value for the subchannel that has the best channel response, as measured from the link adaptation feedback request frame.

In one embodiment, for non-solicited feedback, the frame may include a link adaptation feedback value for a chosen subchannel and also include an indication of the chosen subchannel. In one embodiment, the frame may include link adaptation feedback values for each subchannel within the operation bandwidth. In one embodiment, frame includes an indication of the worst subchannel within the operation bandwidth (e.g., subchannel that has the worst channel response and thus should be avoided). The frame may also include a link adaptation feedback value for the worst subchannel. In one embodiment, the frame includes an indication of the best and the worst subchannels within the operation bandwidth. In one embodiment, the frame includes an indication of the subchannel bandwidth size that is determined to be best suited for the channel conditions. In one embodiment, the frame includes a mix of MCS and SNR information for one or more subchannels. For example, the frame could include an indication of an MCS for the entire operation bandwidth and an indication of an SNR for the best subchannel. As another example, the frame could include an indication of an SNR for the entire operation bandwidth and an indication of an MCS for the best subchannel.

Figure 2A:
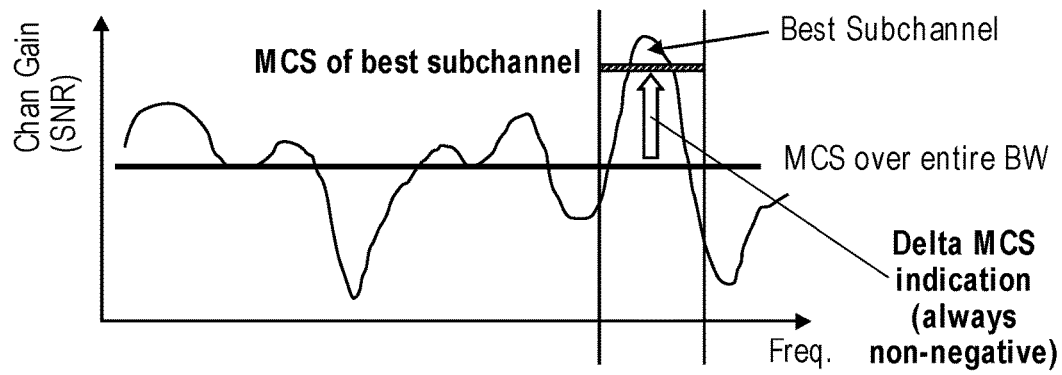
FIG. 2A is a graph illustrating the relationship between an MCS for an entire operation bandwidth and an MCS for a subchannel having the best channel response, according to some embodiments.

If the frame includes a link adaptation feedback value for the subchannel having the best channel response, then this link adaptation feedback value will always have a spectral efficiency that is equal to or higher than the link adaptation feedback value for the entire operation bandwidth. As such, the link adaptation feedback value for the best subchannel may be indicated in the frame as a difference or delta with respect to the link adaptation feedback value for the entire operation bandwidth. This may help reduce the number of bits needed to indicate the link adaptation feedback value for the best subchannel. FIG. 2A is a graph illustrating the relationship between an MCS for an entire operation bandwidth and an MCS for a subchannel having the best channel response, according to some embodiments. The x-axis of the graph represents frequency and the y-axis of the graph represents channel gain (e.g., MCS or SNR). The MCS for the best subchannel is always higher than the MCS for the entire operation bandwidth. As such, the difference between the MCS of the best subchannel and the MCS of the entire operation bandwidth is always positive, and thus the MCS of the best subchannel can be indicated in a frame as a difference or delta with respect to the MCS of the entire operation bandwidth.

Figure 2B:
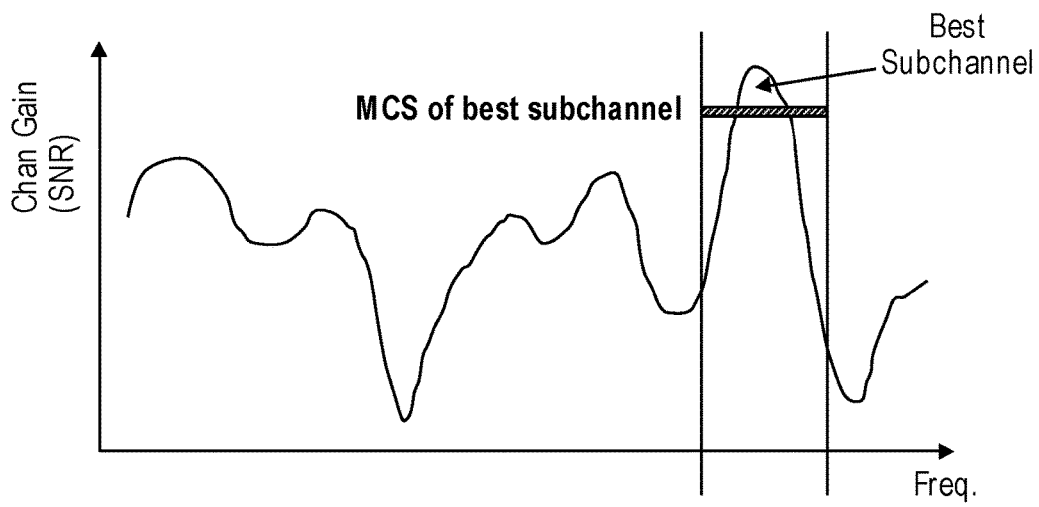
FIG. 2B is a graph illustrating an MCS for the subchannel having the best channel response, according to some embodiments.

According to some embodiments, in order to support efficient link adaptation in a WLAN that employs OFDMA, a frame includes a single link adaptation feedback value, where the single link adaptation feedback value is for an entire operation bandwidth of a wireless communications link or for a subchannel within the operation bandwidth. The subchannel for which link adaptation feedback is provided can be chosen, as desired. For example, the frame may include a link adaptation feedback value for the subchannel having the best channel response, the subchannel having the worst channel response, the subchannel that included the link adaptation feedback request frame (in a solicited feedback case), or any desired subchannel within the operation bandwidth. FIG. 2B is a graph illustrating an MCS for the subchannel having the best channel response, according to some embodiments. The x-axis of the graph represents frequency and the y-axis of the graph represents channel gain (e.g., MCS or SNR).

FIG. 3 is a diagram illustrating an exemplary HT Control Middle field format, according to some embodiments. The diagram shows an HE variant field format that can be used to convey link adaptation feedback information, according to some embodiments. A VHT variant field format and S1G variant field format is also shown for comparative purposes.

In an embodiment where the frame includes two link adaptation feedback values (e.g., a link adaptation feedback value for the entire operation bandwidth and a link adaptation feedback value for a subchannel within the operation bandwidth), the HE variant frame format shown in FIG. 3 may be used to convey link adaptation feedback information. For example, an indication of the link adaptation feedback value for the entire operation bandwidth may be included in the HE-MCS1 field (bits B12-B15). An indication of the link adaptation feedback value for the subchannel may be included in the HE-MCS2 field (bits B18-B19/20) and an indication of the subchannel may be included in the Subchannel field (bits B20/21-B23). The link adaptation feedback value for the subchannel (in the HE-MCS2 field) may be indicated as a difference or delta with respect to the link adaptation feedback value for the entire operation bandwidth (in the HE-MCS1 field). Bits B18-B23 are currently used in the VHT variant and S1G variant of the HT Control field to indicate SNR. It should be understood that the field format described above is provided by way of example and not limitation. Other embodiments may utilize different fields and/or bit positions to convey link adaptation feedback information.

FIG. 4 is a diagram illustrating subchannel division for various operation bandwidth sizes, according to some embodiments. The definition of a subchannel (e.g., size and location of a subchannel) may depend on the size of the operation bandwidth (e.g., the wideband reported in HT Control field). The operation bandwidth can be indicated in a frame along with link adaptation feedback or implicitly derived from the bandwidth of the frame that contains the link adaptation feedback.

As shown, an operation bandwidth of 20 MHz can be divided into four 5 MHz subchannels (subchannels 0-3). An operation bandwidth of 40 MHz can be divided into eight 5 MHz subchannels (subchannels 0-7). An operation bandwidth of 80 MHz can be divided into eight 10 MHz subchannels. Although not shown in the diagram, an operation bandwidth of 160 MHz can be divided into eight 20 MHz subchannels. In the above example, 3 bits is sufficient to indicate the subchannel (since there are a maximum of 8 subchannels within a given operation bandwidth, and thus 3 bits is sufficient to uniquely identify each subchannel). A similar approach can be taken when the subchannel is indicated using more bits or less bits. Although the examples show the subchannels as being contiguous frequency resources, in other embodiments, one or more subchannels may be non-contiguous frequency resources.

In one embodiment, a WLAN device requesting link adaptation feedback may request link adaptation feedback for a certain type of transmission. For example, the WLAN device requesting link adaptation feedback may request link adaptation feedback for non-OFDMA transmissions (e.g., link adaptation feedback for the entire operation bandwidth) or request link adaptation feedback for OFDMA transmissions (e.g., link adaptation feedback for one or more subchannels). In one embodiment, the type of link adaptation feedback requested may be explicitly indicated in the request itself. In another embodiment, a sequence number can be used to indicate the type of link adaptation feedback request. In general, a request for link adaptation feedback includes a request sequence number. In one embodiment, sequence numbers within a certain range may be used to request non-OFDMA link adaptation feedback, while sequence numbers within another range may be used to request OFDMA link adaptation feedback. The link adaptation feedback request type refers to a set of transmission characteristics that the link adaptation feedback shall be computed for. As mentioned above, this may be OFDMA or non-OFDMA transmission. In one embodiment, the link adaptation feedback request type may refer to different encoding schemes such as Binary Convolutional Code (BCC) or Low-Density Parity-Check Code (LDPC), or it may refer to different subchannel bandwidths for link adaptation feedback.

Figure 5A:
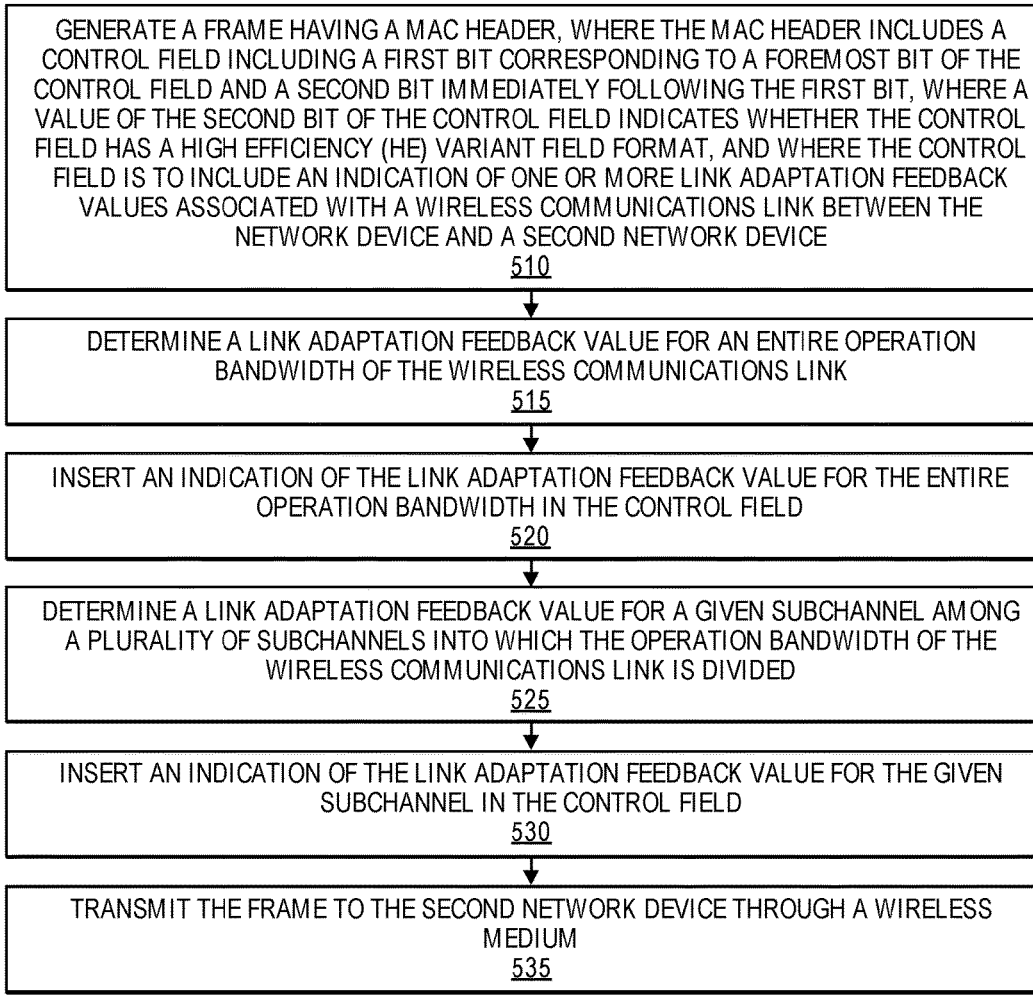
FIG. 5A is a flow diagram of a process for transmitting link adaptation information in a multi-user simultaneous transmission environment, according to some embodiments.

FIG. 5A is a flow diagram of a process for transmitting link adaptation information in a multi-user simultaneous transmission environment, according to some embodiments. In one embodiment, the operations of the flow diagram may be performed by a network device (e.g., a WLAN device such as a STA or AP) in a wireless communications network (e.g., a WLAN). The operations in this flow diagram and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the network device receives a request to provide link adaptation feedback (solicited feedback). However, in some embodiments, the process is initiated without receiving a request to provide link adaptation feedback (unsolicited feedback).

The network device generates a frame having a MAC header, where the MAC header includes a control field including a first bit corresponding to a foremost bit of the control field and a second bit immediately following the first bit, where a value of the second bit of the control field indicates whether the control field has a High Efficiency (HE) variant field format (block 510). The control field is to include an indication of one or more link adaptation feedback values associated with a wireless communications link between the network device and a second network device. In one embodiment, the control field is the HT Control field of the MAC header. In one embodiment, both the first bit and the second bit are set to 1 to indicate that the control field has the HE variant field format. In one embodiment, the first bit is set to 1 and the second bit is set to 0 to indicate that the control field has a VHT variant field format. In one embodiment, the first bit is set to 0 to indicate that the control field has a HT variant field format. In one embodiment, when the network device operates in a 2.4 GHz operating band or 5 GHz operating band, both the first bit and the second bit are set to 1 to indicate that the control field has the HE variant field format. In one embodiment, when the network device operates in a 900 MHz band, both the first bit and the second bit are set to 1 to indicate that the control field has an S1G variant field format. In one embodiment, the frame is a multi-user acknowledgment (ACK) frame such as the multi-user ACK frames described with reference to FIG. 10 and FIG. 11.

In one embodiment, the network device determines a link adaptation feedback value for an entire operation bandwidth of the wireless communications link (block 515). The network device then inserts an indication of the link adaptation feedback value for the entire operation bandwidth in the control field (block 520). In one embodiment, the link adaptation feedback value is an MCS or an SNR.

In one embodiment, the network device determines a link adaptation feedback value for a given subchannel among a plurality of subchannels into which the operation bandwidth of the wireless communications link is divided (block 525). The network device then inserts an indication of the link adaptation feedback value for the given subchannel in the control field (block 530). In one embodiment, the network device also includes an indication of the given subchannel in the control field. In one embodiment, if the control field includes an indication of the link adaptation feedback value for the entire operation bandwidth, the indication of the link adaptation feedback value for the given subchannel is indicated as a difference between the link adaptation feedback value for the given subchannel and the link adaptation feedback value for the entire operation bandwidth. In one embodiment, the given subchannel is the subchannel having a best channel response among the plurality of subchannels into which the operation bandwidth of the wireless communications link is divided. In one embodiment, the network device determines a link adaptation feedback value for each subchannel of a plurality of subchannels into which the operation bandwidth of the wireless communications link is divided and inserts each of the link adaptation feedback values in the control field. In one embodiment, the link adaptation feedback value is an MCS or an SNR.

The network device then transmits the frame to the second network device through a wireless medium (block 535). In this way, the network device may provide link adaptation feedback to the second network device. The link adaptation feedback may include link adaptation feedback for subchannels, which allows for more efficient link adaptation in a multi-user simultaneous transmission environment (e.g., that supports OFDMA).

Figure 5B:
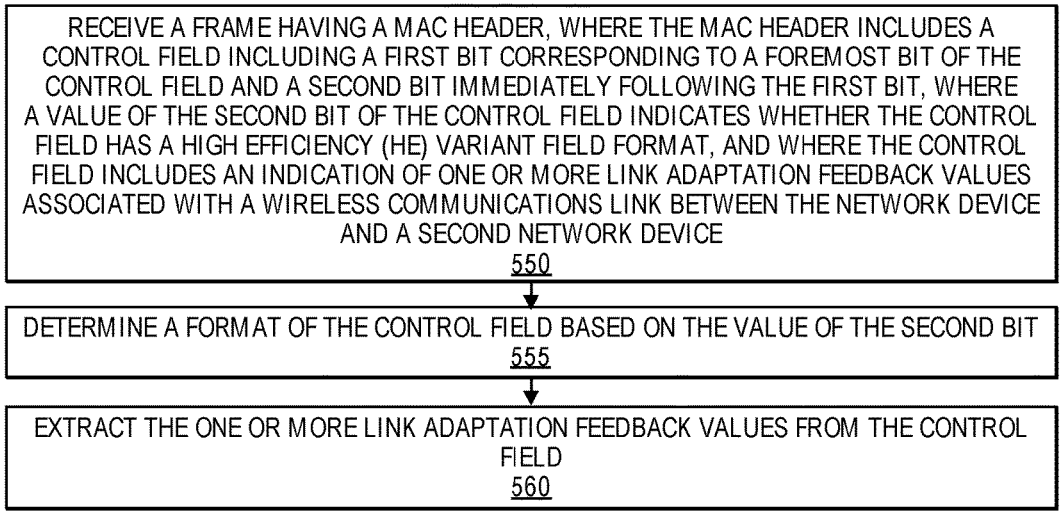
FIG. 5B is a flow diagram of a process for receiving link adaptation information in a multi-user simultaneous transmission environment, according to some embodiments.

FIG. 5B is a flow diagram of a process for receiving link adaptation information in a multi-user simultaneous transmission environment, according to some embodiments. In one embodiment, the operations of the flow diagram may be performed by a network device (e.g., a WLAN device such as a STA or AP) in a wireless communications network (e.g., a WLAN).

In one embodiment, the process is initiated when the network device receives a frame having a MAC header, where the MAC header includes a control field including a first bit corresponding to a foremost bit of the control field and a second bit immediately following the first bit, where a value of the second bit of the control field indicates whether the control field has a High Efficiency (HE) variant field format, where the control field includes an indication of one or more link adaptation feedback values associated with a wireless communications link between the network device and a second network device (block 550). In one embodiment, the control field is the HT Control field of the MAC header. In one embodiment, the one or more link adaptation feedback values include a link adaptation feedback value for a given subchannel within an operation bandwidth of the wireless communications link. The control field may also include an indication of the given subchannel. In one embodiment, the one or more link adaptation feedback values include a link adaptation feedback value for an entire operation bandwidth of the wireless communications link. In one embodiment, the one or more link adaptation feedback values are an MCS and/or an SNR.

The network device determines a format of the control field based on the value of the second bit (block 555). For example, if the second bit of the control field is set to 1, then this indicates that the control field has an HE variant field format, and thus may include link adaptation feedback information for one or more subchannels. On the other hand, if the second bit in the control field is set to 0, then this indicates that the control field has a non-HE variant field format, and thus does not include link adaptation feedback information for subchannels. In one embodiment, the values of the first bit and the second bit (and the operating band) indicate the field format of the control field (e.g., as described with reference to block 510).

The network device extracts the one or more link adaptation feedback values from the control field (block 560). The network device may use the extracted link adaptation feedback values to adapt parameters of the wireless communications link between the network device and the second network device. For example, the network device may use the extracted link adaptation feedback values to select an appropriate MCS to use when transmitting frames to the second network device. In this way, the network device receives link adaptation feedback from the second network device. The link adaptation feedback may include link adaptation feedback for subchannels, which allows for more efficient link adaptation in a multi-user simultaneous transmission environment (e.g., that supports OFDMA).

In uplink multi-user simultaneous transmissions, data frames from multiple STAs are transmitted simultaneously to an AP, either in different frequency domain, spatial domain, or combination of frequency and spatial domain. The AP may respond with individual acknowledgement (ACK) frames for each STA. However, individual ACK frame transmission incurs extra airtime overhead from inter-frame spacing (IFS) times and preamble overhead. Instead of responding with individual ACK frames for each STA, the AP may respond with a single PPDU that contains ACK responses for multiple STAs (i.e., a multi-user (MU) ACK response PPDU). An example of such an operation is described with reference to FIG. 6.

Figure 6:
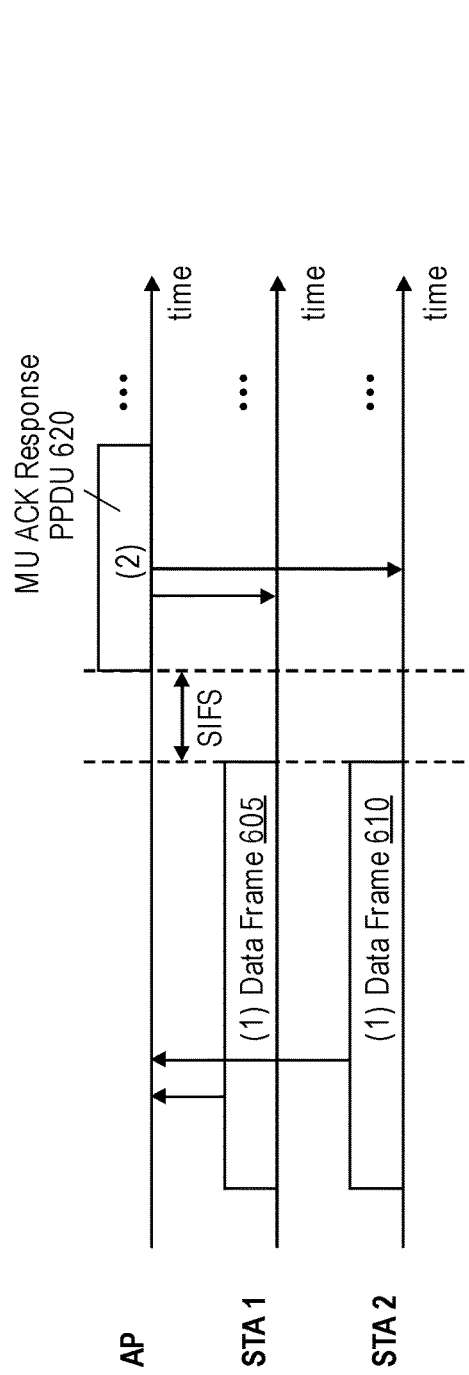
FIG. 6 is a timing diagram illustrating WLAN operations where an AP transmits a multi-user ACK response PPDU in response to receiving an uplink multi-user simultaneous transmission, according to some embodiments.

FIG. 6 is a timing diagram illustrating WLAN operations where an AP transmits a multi-user ACK response PPDU in response to receiving an uplink multi-user simultaneous transmission, according to some embodiments. As shown in the diagram, STA1 and STA2 simultaneously transmit a data frame to the AP. STA1 transmits data frame 605 and STA2 transmits data frame 610. After Short Interframe Space (SIFS) elapses, the AP broadcasts an MU ACK response PPDU 620 to both STA1 and STA2. The MU ACK response PPDU 620 serves as an acknowledgement for both data frame 605 (transmitted by STA1) and data frame 610 (transmitted by STA2). In such a case where a single PPDU contains multiple ACK responses (referred to herein as an MU ACK response PPDU), the PPDU may not have appropriate subfields (e.g., HT Control field) to individually feedback link adaptation information (e.g., MCS or SNR) for each user (e.g., a STA) of the multi-user simultaneous transmission. Embodiments disclosed herein provide a mechanism for transmitting link adaptation feedback in a multi-user simultaneous transmission environment.

Aggregation of ACK responses for multiple users may be done in the MAC layer (e.g., Aggregated Mac Service Data Unit (A-MSDU)) and thus only one HT Control field may be available per PPDU/frame. Since the MU ACK response PPDU may be broadcasted in order to allow all participating users to correctly receive the multi-user ACK responses, it may not be practical to include link adaptation feedback in the HT Control field. Thus, in one embodiment, users receiving an MU ACK response PPDU should not expect link adaptation feedback to be included in such a PPDU and the transmitter of such PPDU should not include link adaptation feedback in the PPDU.

Figure 7:
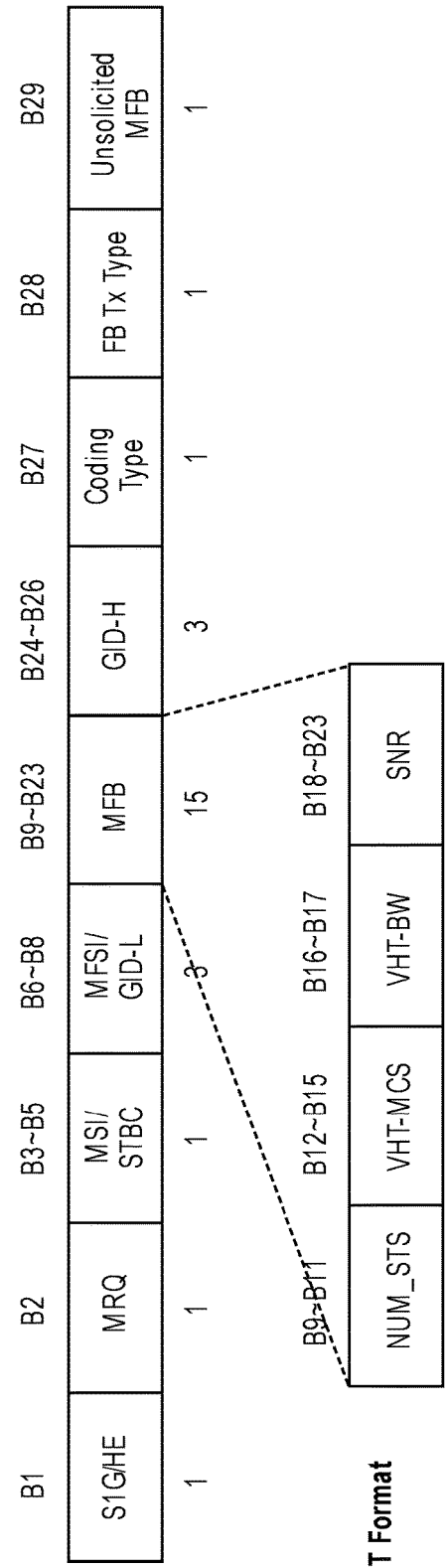
FIG. 7 is a diagram illustrating an exemplary HT Middle Control field format, according to some embodiments.

In one embodiment, instead of the MU ACK response PPDU not including any link adaptation feedback, the MU ACK response PPDU includes link adaptation feedback for a single one of the users that is to receive the MU ACK response PPDU. The MU ACK response PPDU may also include an indication of which recipient/user among the multiple recipients of the MU ACK response PPDU the link adaptation feedback is intended for. In one embodiment, the SNR field of the HT Middle Control field is used to indicate the user for which the link adaptation feedback is intended for. That is, instead of the SNR field being used to indicate SNR, the SNR field is used to indicate the user for which the link adaptation feedback is intended for. An exemplary field format for an HT Middle Control field is shown in FIG. 7. As shown, the SNR field occupies bits B18-B23 (in VHT variant field format). As discussed above, these bits can be used to indicate the user for which the link adaptation feedback is intended for.

In one embodiment, the link adaptation feedback included in a MU ACK response PPDU is always for a primary user of the multi-user simultaneous transmission (and the user that the link adaptation feedback is intended for is not explicitly indicated in the MU ACK response PPDU). The primary user may be selected by the transmitter of the MU ACK response PPDU or may be predefined as part of the multi-user simultaneous transmission. For example, the primary user may be determined and indicated (either by explicit or implicit signaling) by the transmitter of the MU ACK response PPDU during setup and synchronization of the multi-user simultaneous transmission. As another example, the primary user of the multi-user simultaneous transmission may be defined as the first logical user in the OFDMA or Multi-User Multiple-Input Multiple-Output (MU-MIMO) transmission associated with the resource (e.g., time/frequency/space) signaling in the HE-SIG control information.

Figure 8:
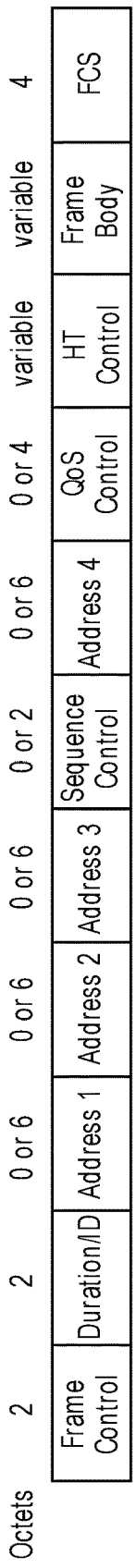
FIG. 8 is a diagram illustrating an exemplary MAC frame format with a variable-length HT Control field, according to some embodiments.

In one embodiment, instead of the MU ACK response PPDU including link adaptation feedback for a single user, the MU ACK response PPDU includes link adaptation feedback for multiple users. In one embodiment, this is achieved by extending the HT Control field of the MAC header such that an HT Control field for each user can be accommodated in the MU ACK response PPDU. For example, this can be achieved by having a variable-length HT Control field in the MAC header. An exemplary MAC frame format with a variable-length HT Control field is shown in FIG. 8. As shown, the HT Control field of the MAC frame has variable length and thus the size of the HT Control field can be adjusted to accommodate link adaptation feedback for each user of a multi-user simultaneous transmission.

Figure 9:
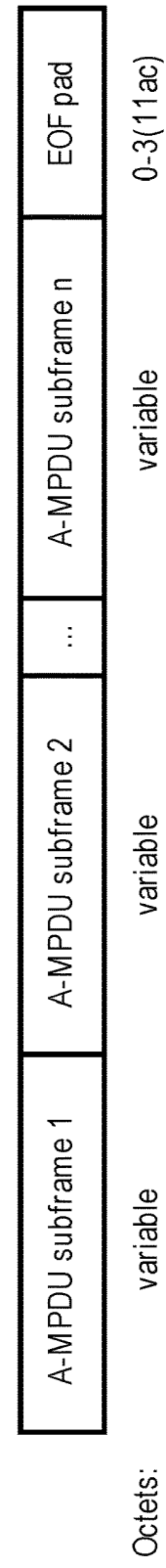
FIG. 9 is a diagram illustrating an exemplary A-MPDU frame structure, according to some embodiments.

In another embodiment, MAC frame aggregation in the physical layer (e.g., Aggregated Mac Protocol Data Unit (A-MPDU)) can be utilized to accommodate link adaptation feedback for multiple users in the MU ACK response PPDU. For example, an ACK response for each user may be encapsulated in an individual MAC frame (e.g., MPDU) and multiple ACK responses, each containing its own HT Control field, are aggregated in the physical layer into a single PPDU and transmitted. Since each ACK response contains the address of the intended recipient and its own HT Control field, the transmitter of the MU ACK response PPDU is able to convey link adaptation feedback for each user individually. An exemplary A-MPDU frame structure is shown in FIG. 9. The A-MPDU includes multiple A-MPDU subframes (A-MPDU subframes 1-$n$). Each A-MPDU subframe may be a MAC frame such as the MAC frame shown in FIG. 1, and thus each A-MPDU subframe includes its own MAC header, including link adaptation feedback for a corresponding user.

It should be noted that if cyclic prefix size is configured incorrectly, this may result in inter-symbol interference (ISI) and degrade link performance. Thus, it may be beneficial to know the cyclic prefix size in which link adaptation feedback measurements took place. In the case of solicited link adaptation feedback, the measurement of the link adaptation feedback value is typically performed using the frame that included the link adaptation feedback request. Thus, the transmitter knows the cyclic prefix of the frame that was used to perform link adaptation feedback value measurements and is able to know whether the cyclic prefix was correctly configured or not. However, in the case of unsolicited link adaptation feedback, the transmitter typically does not have knowledge of the cyclic prefix of the frame that was used for link adaptation feedback measurement. If the receiver performed link adaptation feedback measurements on a frame that had a cyclic prefix configuration that was too short, the link adaptation feedback value may be corrupt and/or incorrect. Thus, in one embodiment, the link adaptation feedback includes an indication of the cyclic prefix size of the frame that was used for link adaptation feedback measurements.

In one embodiment, the transmitter may be able to restrict the frames which can be used to perform link adaptation feedback measurements at the receiver. For example, if a wireless link between the transmitter and receiver has high channel delay spread, the receiver may only perform link adaptation feedback measurements that satisfy certain conditions, such as only when a cyclic prefix size of the packet is a certain size. The measurement restriction may be in the form of explicit indication or implicitly derived from TXVECOTR/RXVECTOR parameters of the measurement frame. For example, users who were receiving and transmitting frames using a long cyclic prefix (e.g., 3.2 microseconds cyclic prefix) may be restricted to only take measurement from frames that are configured with long cyclic prefix and provide unsolicited link adaptation feedback.

Figure 10:
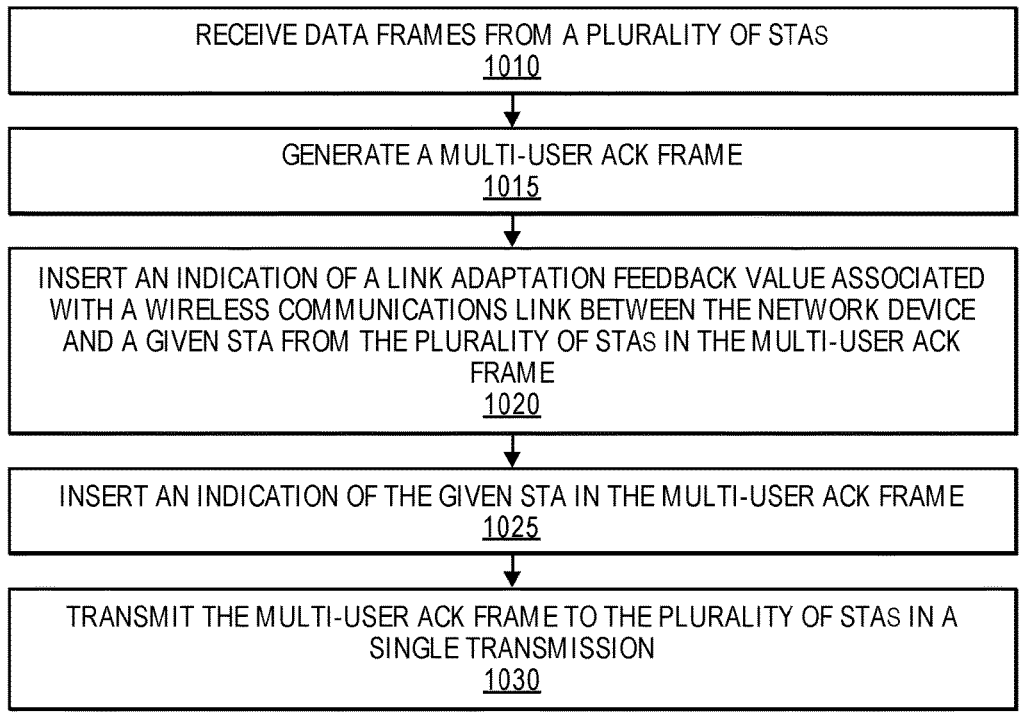
FIG. 10 is a flow diagram of a process for transmitting link adaptation information for a single user in a multi-user ACK frame, according to some embodiments.

FIG. 10 is a flow diagram of a process for transmitting link adaptation information for a single user in a multi-user ACK frame, according to some embodiments. In one embodiment, the operations of the flow diagram may be performed by a network device (e.g., a WLAN device such as an AP) in a wireless communications network (e.g., a WLAN).

In one embodiment, the process is initiated when the network device receives data frames from a plurality of STAs (e.g., as part of a multi-user simultaneous transmission) (block 1010). In response, the network device generates a multi-user ACK frame (block 1015). The multi-user ACK frame (e.g., an MU ACK response PPDU) serves to acknowledge the data frames received from the plurality of STAs.

The network device inserts an indication of a link adaptation feedback value associated with a wireless communications link between the network device and a given STA from the plurality of STAs in the multi-user ACK frame (block 1020). In one embodiment, the indication of the link adaptation feedback value is inserted in a control field (e.g., HT Control field) of the multi-user ACK frame. In one embodiment, the link adaptation feedback value inserted in the multi-user ACK frame is for a subchannel within an operation bandwidth. In one embodiment, the link adaptation feedback value is an MCS or an SNR.

In one embodiment, the network device also inserts an indication of the given STA in the multi-user ACK frame (block 1025). In one embodiment, the indication of the given STA is inserted in a MAC header of the multi-user ACK frame (e.g., in an SNR field of the HT Control field). In one embodiment, the given STA is a primary STA (or primary user) among the plurality of STAs and the STAs receiving the multi-user ACK frame are able to discern that the given STA is the primary STA without an explicit indication in the multi-user ACK frame. In one embodiment, the network device may have previously determined which STA is the primary STA and conveyed this information to the plurality of STAs. In another embodiment, the primary STA is defined to be the first logical user in a multi-user simultaneous transmission.

The network device then transmits the multi-user ACK frame to the plurality of STAs in a single transmission (block 1030). In this way, link adaptation feedback for a single STA participating in a multi-user simultaneous transmission is provided in the multi-user ACK frame.

Figure 11:
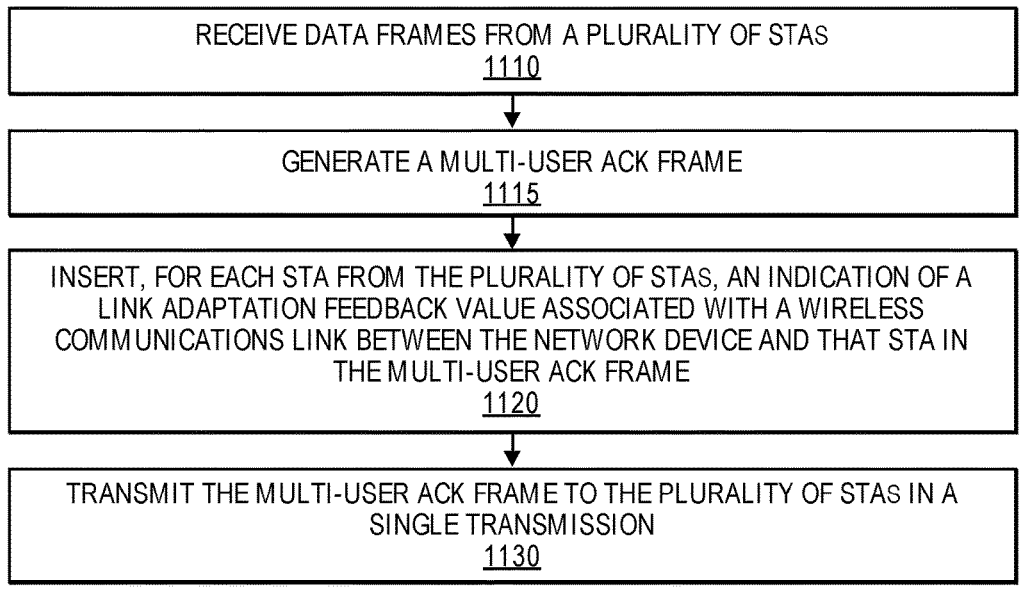
FIG. 11 is a flow diagram of a process for transmitting link adaptation information for multiple users in a multi-user ACK frame, according to some embodiments.

FIG. 11 is a flow diagram of a process for transmitting link adaptation information for multiple users in a multi-user ACK frame, according to some embodiments. In one embodiment, the operations of the flow diagram may be performed by a network device (e.g., a WLAN device such as an AP) in a wireless communications network (e.g., a WLAN).

In one embodiment, the process is initiated when the network device receives data frames from a plurality of STAs (e.g., as part of a multi-user simultaneous transmission) (block 1110). In response, the network device generates a multi-user ACK frame (block 1115). The multi-user ACK frame (e.g., an MU ACK response PPDU) serves to acknowledge the data frames received from the plurality of STAs.

The network device inserts, for each STA from the plurality of STAs, an indication of a link adaptation feedback value associated with a wireless communications link between the network device and that STA in the multi-user ACK frame (block 1120). In one embodiment, one or more of the link adaptation feedback values inserted in the multi-user ACK frame are for a subchannel within an operation bandwidth. In one embodiment, the indication of the link adaptation feedback values for the plurality of STAs are inserted in a variable-size control field (e.g., a variable-size HT Control field) of a MAC header of the multi-user ACK frame (e.g., as described with reference to FIG. 8). In another embodiment, the indication of the link adaptation feedback values for the plurality of STAs are inserted in the multi-user ACK frame using MAC frame aggregation (e.g., as described with reference to FIG. 9). In one embodiment, one or more of the link adaptation feedback values inserted in the multi-user ACK frame are an MCS or an SNR.

The network device then transmits the multi-user ACK frame to the plurality of STAs in a single transmission (block 1130). In this way, link adaptation feedback for multiple STAs of a multi-user simultaneous transmission is provided in the multi-user ACK frame.

Figure 12:
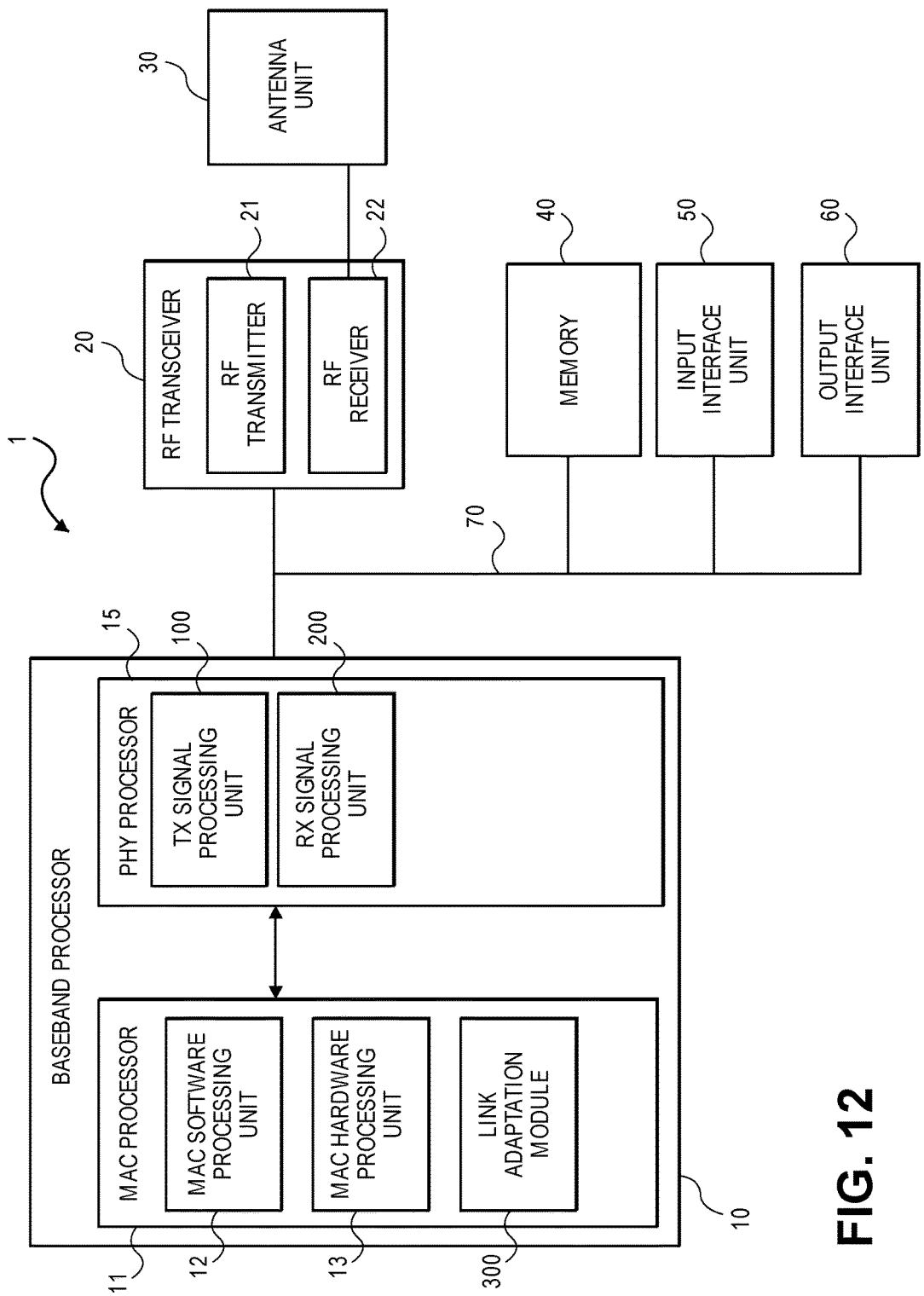
FIG. 12 is a block diagram of a network device implementing a station or access point that executes a link adaptation process and module, according to some embodiments.
Figure 13:
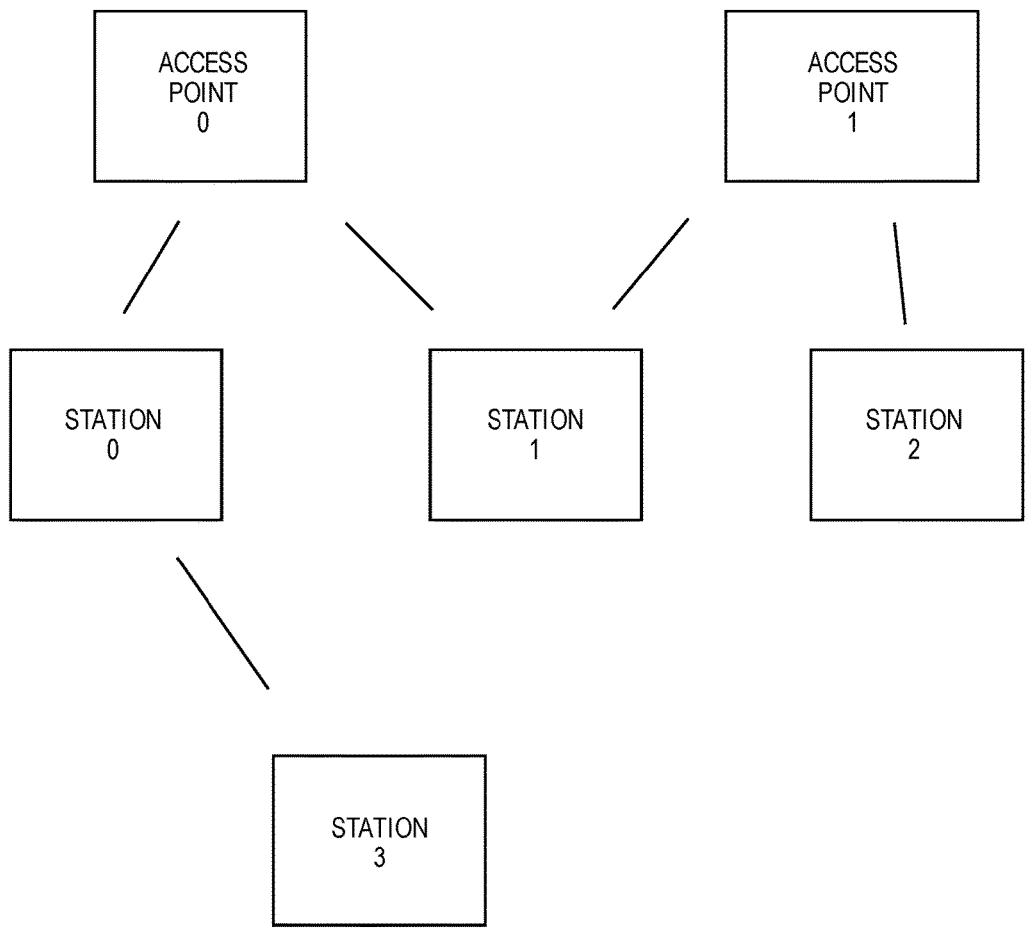
FIG. 13 is a block diagram of a wireless local area network, according to some embodiments.

FIG. 12 is a block diagram of a network device implementing a station or access point that executes a link adaptation process and module, according to some embodiments. In a wireless local area network (WLAN) such as the example WLAN illustrated in FIG. 13, a basic service set (BSS) includes a plurality of network devices referred to herein as WLAN devices. Each of the WLAN devices may include a medium access control (MAC) layer and a physical (PHY) layer according to IEEE 802.11 standard. In the plurality of WLAN devices, at least one WLAN device may be an access point (AP) station (e.g., access point 0 and access point 1 in FIG. 13) and the other WLAN devices may be non-AP stations (non-AP STAs), (e.g., stations 0-3 in FIG. 13). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 13, a WLAN can have any combination of stations and access points that can form a discrete network, an ad hoc network or any combination thereof. Any number of APs and stations can be included in a WLAN and any topology and configuration of such APs and stations in the network can be utilized.

The example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC). In some embodiments, the MAC processor 11 also implements a link adaptation module 300. The link adaptation module 300 can implement the respective functions for any combination of the embodiments described herein above with regard to FIGS. 1-11. In other embodiments, the link adaptation module 300 may be implemented by or distributed over both the PHY processor 15 and the MAC processor 11. The link adaptation module 300 may be implemented as software or as hardware components of either the PHY processor 15 or MAC processor 11.

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 9 and 10.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store recorded information about captured frames. The input interface unit 50 receives information from a user and the output interface unit 60 outputs information to the user.

The antenna unit 30 includes one or more antennas. When a MIMO or MU-MIMO system is used, the antenna unit 30 may include a plurality of antennas.

Figure 14:
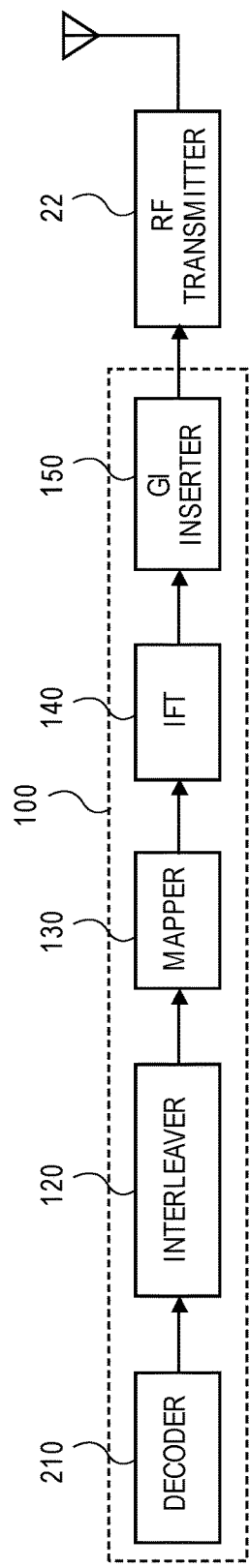
FIG. 14 is a schematic block diagram exemplifying a transmitting signal processor in a WLAN device, according to some embodiments.

FIG. 14 is a schematic block diagram exemplifying a transmitting signal processor in a WLAN device, according to some embodiments. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input-multiple output (MIMO) or multiple user (MU)-MIMO is used, the transmitting signal processing unit 100 may use a plurality of interleavers 120 and a plurality of mappers 130 corresponding to the number $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 15:
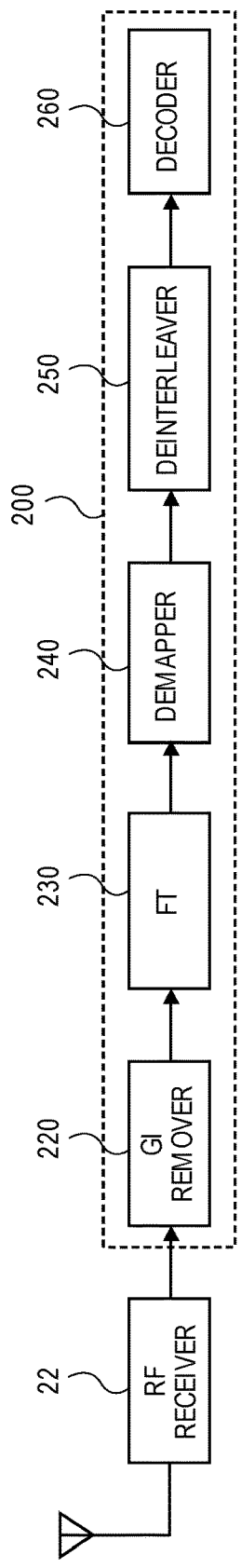
FIG. 15 is a schematic block diagram exemplifying a receiving signal processing unit in the WLAN, according to some embodiments.

FIG. 15 is a schematic block diagram exemplifying a receiving signal processing unit in the WLAN, according to some embodiments. Referring to FIG. 15, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 260 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

Figure 16:
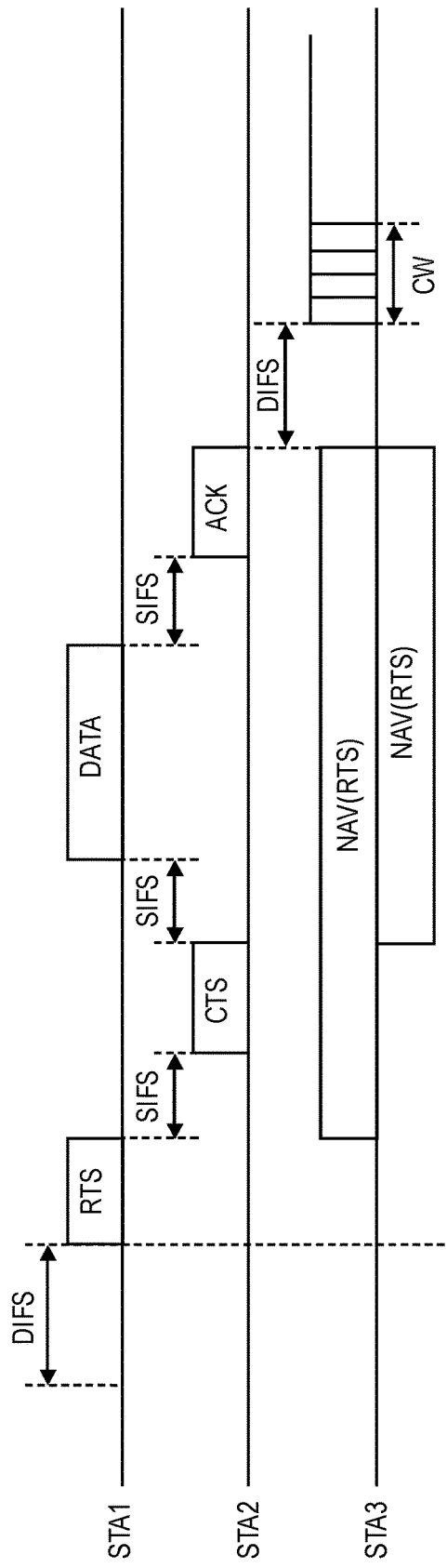
FIG. 16 is a timing diagram providing an example of the carrier sense multiple access/collision avoidance (CSMA/CA) transmission procedure, according to some embodiments.

FIG. 16 is a timing diagram providing an example of the CSMA/CA transmission procedure, according to some embodiments. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+ SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+ SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

The solutions provided herein have been described with reference to a wireless LAN system; however, it should be understood that these solutions are also applicable to other network environments, such as cellular telecommunication networks, wired networks, and similar communication networks.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

While the flow diagrams in the figures herein show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. For example, the above mentioned techniques for providing link adaptation feedback may also be applied for link adaptation feedback requests. The description is thus to be regarded as illustrative instead of limiting.

What is claimed is:

1. A method performed by a network device in a Wireless Local Area Network (WLAN) for transmitting link adaptation information, the method comprising:
    generating a frame having a Media Access Control (MAC) header, wherein the MAC header includes a control field including a first bit corresponding to a foremost bit of the control field and a second bit immediately following the first bit, wherein a value of the second bit of the control field indicates whether the control field has a High Efficiency (HE) variant field format, and wherein the control field is to include an indication of one or more link adaptation feedback values associated with a wireless communications link between the network device and a second network device;
    determining a link adaptation feedback value for an entire operation bandwidth of the wireless communications link;
    inserting an indication of the link adaptation feedback value for the entire operation bandwidth in the control field;
    determining a link adaptation feedback value for a given subchannel among a plurality of subchannels into which the operation bandwidth of the wireless communications link is divided;
    inserting an indication of the link adaptation feedback value for the given subchannel in the control field, wherein the indication of the link adaptation feedback value for the given subchannel is indicated as a difference between the link adaptation feedback value for the given subchannel and the link adaptation feedback value for the entire operation bandwidth; and
    transmitting the frame to the second network device through a wireless medium.

2. The method of claim 1, wherein both the first bit and the second bit are set to 1 to indicate that the control field has the HE variant field format.

3. The method of claim 2, wherein the first bit is set to 1 and the second bit is set to 0 to indicate that the control field has a Very High Throughput (VHT) variant field format, and wherein the first bit is set to 0 to indicate that the control field has a High Throughput (HT) variant field format.

4. The method of claim 2, wherein, when an operating band is 2.4 GHz or 5 GHz, both the first bit and the second bit are set to 1 to indicate that the control field has the HE variant field format.

5. The method of claim 2, wherein, when an operating band is 900 MHz, both the first bit and the second bit are set to 1 to indicate that the control field has a Sub 1 GHz (S1G) variant field format.

6. The method of claim 1, further comprising:
    inserting an indication of the given subchannel in the control field.

7. The method of claim 1, wherein the given subchannel is a subchannel having a best channel response among the plurality of subchannels into which the operation bandwidth of the wireless communications link is divided.

8. The method of claim 1, wherein the link adaptation feedback value for the given subchannel is any one of a Modulation Coding Scheme (MCS) and a Signal-to-Noise Ratio (SNR).

9. The method of claim 1, wherein the frame is a multi-user acknowledgment (ACK) frame generated by the network device in response to receiving data frames from a plurality of STAs including the second network device as part of a multi-user simultaneous transmission.

10. The method of claim 9, further comprising:
    inserting an indication of an identity of the second network device in the control field.

11. The method of claim 9, wherein the second network device is a primary STA among the plurality of STAs.

12. A method performed by a network device in a Wireless Local Area Network (WLAN) for receiving link adaptation information, the method comprising:
    receiving a frame having a Media Access Control (MAC) header, wherein the MAC header includes a control field including a first bit corresponding to a foremost bit of the control field and a second bit immediately following the first bit, wherein a value of the second bit of the control field indicates whether the control field has a High Efficiency (HE) variant field format, and wherein the control field includes an indication of one or more link adaptation feedback values associated with a wireless communications link between the network device and a second network device, wherein the one or more link adaptation feedback values include a link adaptation feedback value for an entire operation bandwidth of the wireless communications link and a link adaptation feedback value for a given subchannel within the operation bandwidth of the wireless communications link wherein the link adaptation feedback value for the given subchannel is indicated as a difference between the link adaptation feedback value for the given subchannel and the link adaptation feedback value for the entire operation bandwidth;

determining a field format of the control field based on the value of the second bit; and extracting the one or more link adaptation feedback values from the control field.

13. The method of claim 12, further comprising:
receiving data frames from a plurality of STAs;
generating a multi-user acknowledgment (ACK) frame;
inserting, for each STA from the plurality of STAs, an indication of a link adaptation feedback value associated with a wireless communications link between the network device and that STA in the multi-user ACK frame; and
transmitting the multi-user ACK frame to the plurality of STAs in a single transmission.

14. The method of claim 13, wherein the indications of the link adaptation feedback values are inserted in a variable-size control field of a Media Access Control (MAC) header of the multi-user ACK frame.

15. The method of claim 13, wherein the indications of the link adaptation feedback values are inserted in the multi-user ACK frame using MAC frame aggregation.

* * * * *